United States Patent [19]

Johnson et al.

[11] Patent Number: 4,514,692

[45] Date of Patent: Apr. 30, 1985

[54] METAL DETECTOR AND DISCRIMINATOR USING DIFFERENTIATION FOR BACKGROUND SIGNAL SUPPRESSION

[75] Inventors: David E. Johnson, Los Banos; Richard W. Williams, Dos Palos, both of Calif.

[73] Assignee: FRL, Inc., Los Banos, Calif.

[21] Appl. No.: 373,900

[22] Filed: May 3, 1982

[51] Int. Cl.³ .............................................. G01V 3/11
[52] U.S. Cl. .................................. 324/329; 324/233; 328/165
[58] Field of Search ....................... 324/233, 326, 329; 340/38 L, 551, 567, 941; 328/165, 132, 142

[56] References Cited

U.S. PATENT DOCUMENTS

| | | | |
|---|---|---|---|
| 3,732,499 | 5/1973 | Danell et al. | 328/165 |
| 3,833,850 | 9/1974 | Weber | 324/236 |
| 3,916,301 | 10/1975 | Vild et al. | 324/233 X |
| 4,016,486 | 4/1977 | Pecori | 324/326 |
| 4,122,776 | 10/1978 | Tedder | 328/165 X |
| 4,128,803 | 12/1978 | Payne | 324/329 |

Primary Examiner—Gerard R. Strecker
Attorney, Agent, or Firm—Flehr, Hohbach, Test, Albritton & Herbert

[57] ABSTRACT

Eddy current type metal detector for locating and distinguishing between metal objects of different types in the ground or other surroundings. Differentiation is employed to eliminate signals from the ground soil or other material in which the object is located, and objects of a particular type are detected from the phases of signals which they produce.

12 Claims, 5 Drawing Figures

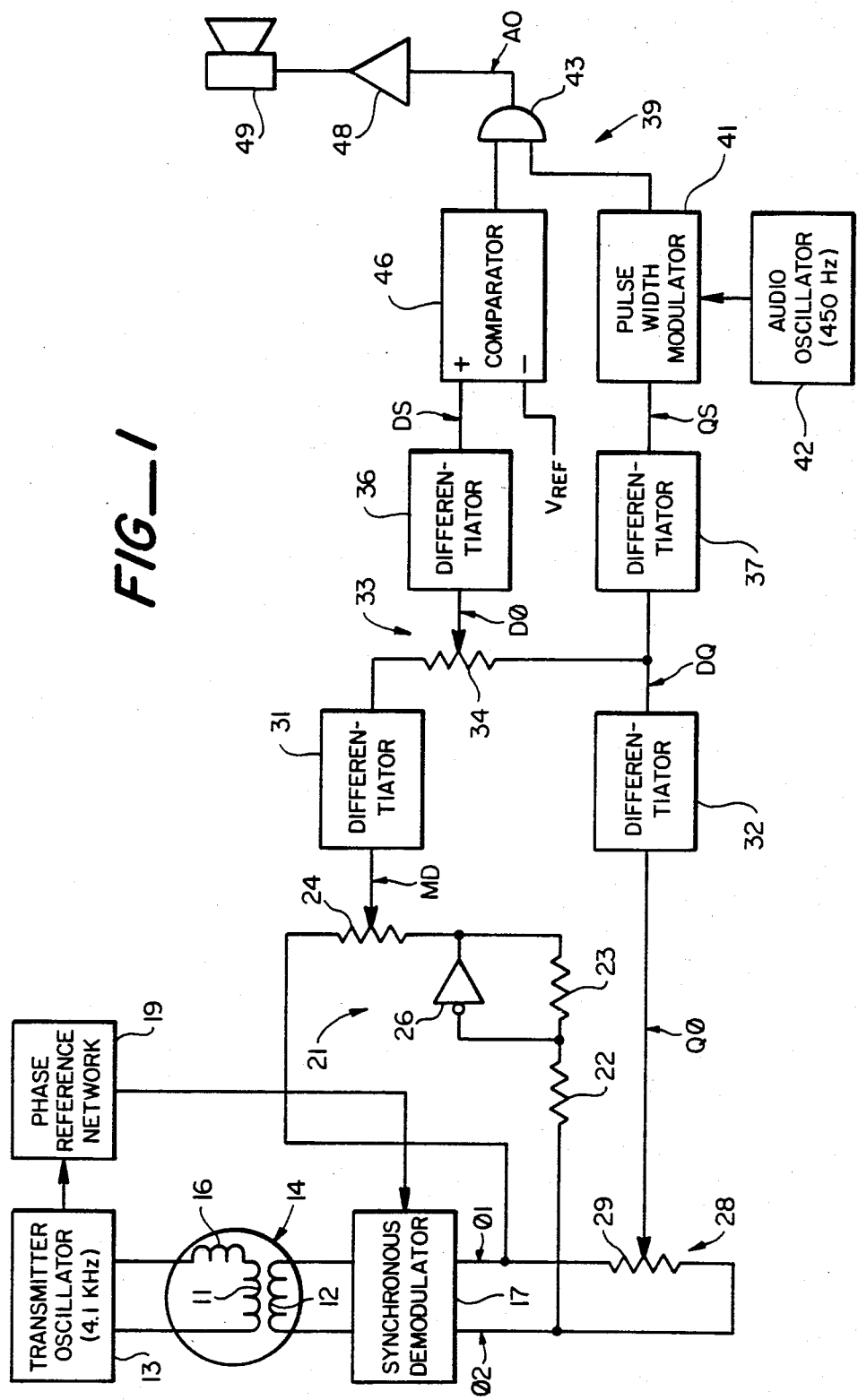
FIG_1

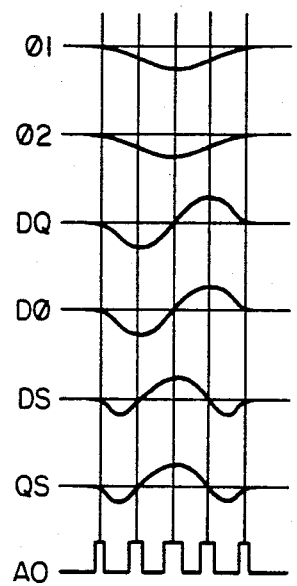
FIG_2A
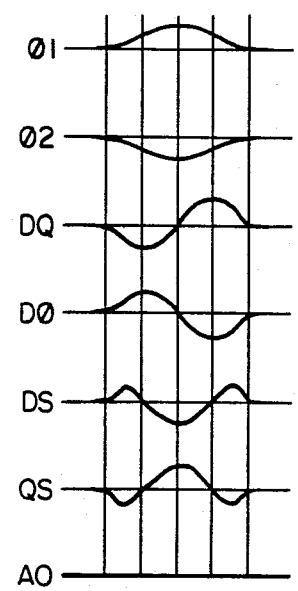
FIG_2B
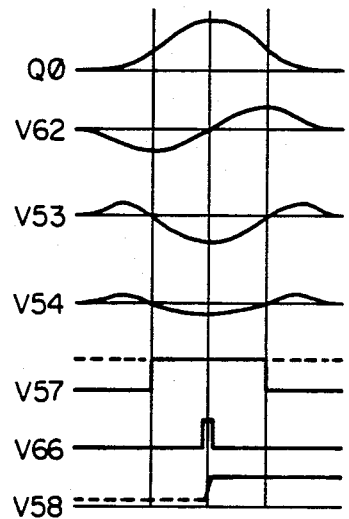
FIG_4

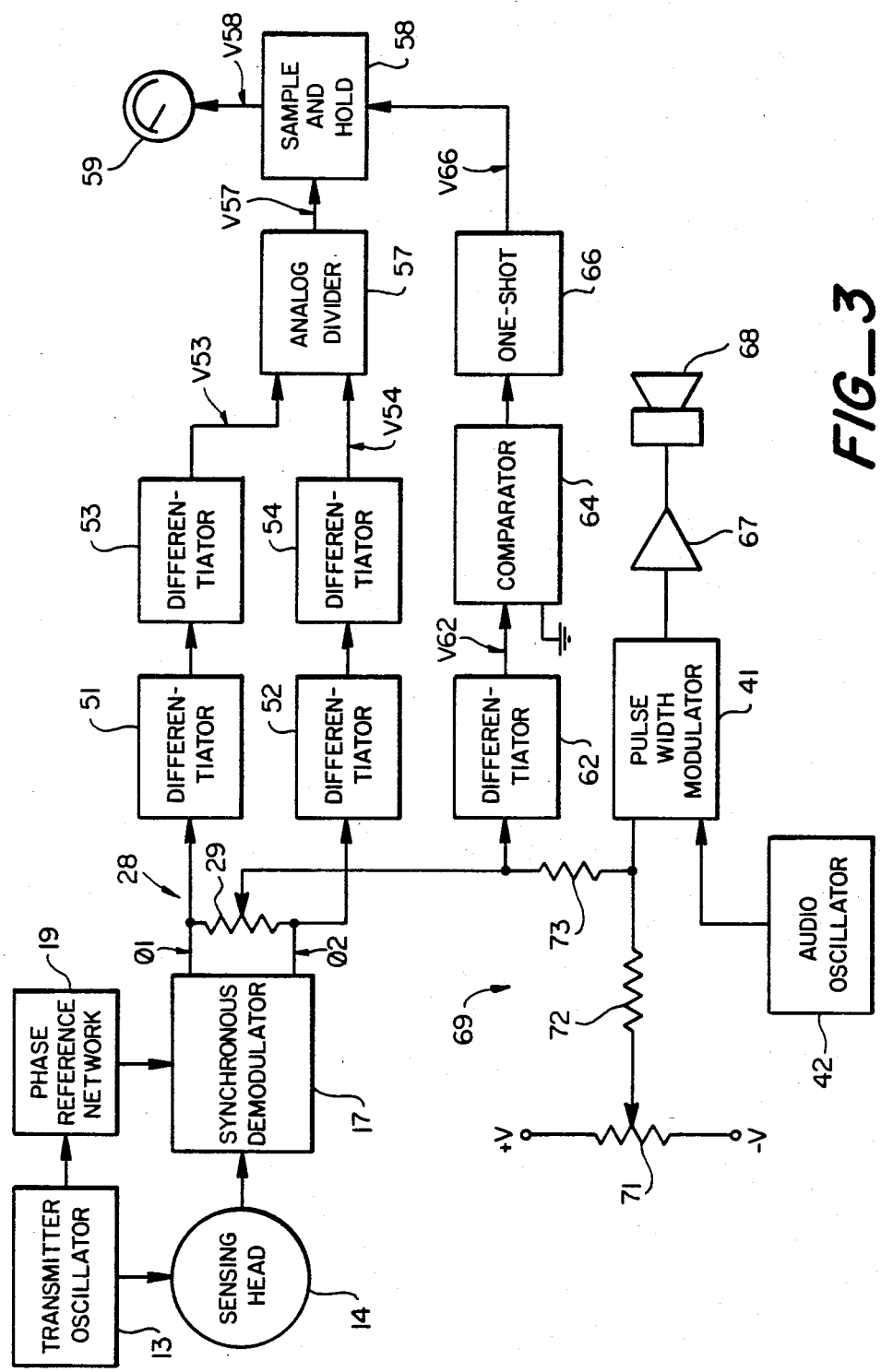
FIG_3

METAL DETECTOR AND DISCRIMINATOR USING DIFFERENTIATION FOR BACKGROUND SIGNAL SUPPRESSION

This invention pertains generally to metal detectors, and more particularly to a metal detector for locating and discriminating between metal objects in the ground or other surroundings.

Metal detectors are utilized in a variety of applications such as finding objects in the ground and detecting unwanted objects in an industrial material stream. Such detectors typically operate by transmitting an alternating signal which is monitored with a receiver to detect the presence of metal objects in the mutual fields of the transmitter and receiver. Due to their electrical and magnetic properties, metal objects provide phase changes in the received signals which are characteristic of the objects. Thus, by monitoring the received signals, it is possible to detect the presence of a metal object and to discriminate between different types of metal objects.

In many instances, the ground soil or other material in which an object is to be detected also has electrical and/or magnetic properties which can produce changes in the phase of the received signal and thereby interfere with the detection of metal objects. One prior technique for overcoming this problem is to synchronously demodulate the received signal in phase quadrature with the signal produced by the soil or other background material. While this technique effectively eliminates the background signal and makes it easier to detect the presence of metal objects, the demodulated signal contains no phase information for distinguishing between different types of metal objects.

There have also been attempts to provide information on the phase of a metal target separately from the phase of the background material. In one such approach, the received signal is demodulated at the discrimination phase, i.e. the phase of signals corresponding to objects of the type to be detected, and the demodulated signal is AC coupled to another stage of the processing circuitry, with the expectation that amplitude and phase variations due to the background material will be so slow as to be effectively decoupled. In a somewhat similar approach, the received signal is again demodulated at the discrimination phase, and a slow feedback network keeps the demodulated signal at a null except when passing over a target. Neither of these techniques, however, is very effective in eliminating soil signal interference.

In another prior method of eliminating background signal interference, two synchronous demodulators are employed, one operating in phase quadrature with the background signal and the other operating at the discrimination phase. The demodulated discrimination signal is gated by the demodulated phase quadrature signal and thereby maintained at a null in the absence of a metal target. This approach gives a moderate amount of background signal rejection, and it provides a metal detector having a good operator "feel" for use by hobbyists.

U.S. Pat. No. 4,128,803 describes a metal detector in which signals synchronously demodulated in phase quadrature with the background signal and at the desired discrimination phase are passed through matched bandpass filters of moderate Q and then applied to a third synchronous demodulator to provide an output signal having an amplitude indicative of the presence of metal objects and a polarity indicative of the type of object being detected. This output signal is passed through a lowpass filter and applied to an indicator circuit. This system operates on the theory that background signals have little energy at the frequencies passed by the filters whereas target signals have substantial energy at these frequencies. While this system provides good rejection of the background signal, the ringing effect of the bandpass filter and the low pass filtering tend to integrate the output signal, producing a "smearing" effect in which the target signal appears to come from a much larger area than the actual target. In order to locate the target with sufficient accuracy, it is necessary to switch this device to a static mode of operation. In addition, the sensitivity of the system is highly dependent upon the rate at which the detector is moved since the received signals must fall within the pass band of the filters.

U.S. Pat. No. 3,986,104 describes a system in which a magnetic field of two frequencies is transmitted, and changes in this field are monitored to provide two varying DC signals representative of the resistive component of the field distortion at the two frequencies. The ratio of the two signals provides an indication of the resistivity of the target. This system is not capable of distinguishing between ferrous and nonferrous objects, and it is difficult to obtain satisfactory performance with a system which cannot be optimized for operation at a single frequency.

It is in general an object of the invention to provide a new and improved metal detector which overcomes the foregoing and other difficulties of metal detectors heretofore provided.

Another object of the invention is to provide a metal detector of the above character which is capable of discriminating between different types of metal objects as well as locating the objects in the ground or other surroundings.

Another object of the invention is to provide a metal detector of the above character in which interference due to soil signals and other background signals is minimized.

These and other objects are achieved in accordance with the invention by providing a metal detector having transmitting and receiving means movable relative to the ground and the object to be detected. The transmitting means is energized to provide an alternating magnetic field which produces a signal in the receiving means. The received signal is synchronously demodulated to provide first and second components at different phases, and these components are differentiated and combined to provide a first signal which differs in phase from the ground soil signal by 90° and a second signal which corresponds to phase of an object to be detected. These signals are combined to provide an indication of the presence of an object of the type to be detected.

FIG. 1 is a block diagram of one embodiment of a metal detector according to the invention.

FIG. 2A and 2B are waveform diagrams illustrating the operation of the embodiment of FIG. 1 for "good" and "bad" targets, respectively.

FIG. 3 is a block diagram of a second embodiment of a metal detector according to the invention.

FIG. 4 is a waveform diagram illustrating the operation of the embodiment of FIG. 3.

As illustrated in FIG. 1, the metal detector comprises a transmitting coil 11 and a receiving coil 12 with an oscillator 13 connected to the transmitting coil for energizing the same with an AC signal of suitable frequency, e.g. 4.1 KHz. The receiving coil is positioned within the field of the transmitting coil, and the two coils are maintained in relatively fixed positions in a sensing head 14 which can be moved about over the surface of the ground or other area to be searched. Electrically conductive and/or magnetically susceptible elements which come into the mutual field of the coils produce a change in the amplitude and/or phase of the received signal. A feedback coil 16 is connected electrically in series with the transmitting coil and positioned near the receiving coil to minimize inductive coupling between the transmitting and receiving circuits in the absence of an object or other electrically conductive or magnetically susceptible material in the mutual field of the coils.

Signals from the receiving coil are applied to a synchronous demodulator 17 which provides output signals $\emptyset 1$ and $\emptyset 2$ which are demodulated at arbitrarily selected phases relative to the transmitted signal. Phase reference signals are derived from the transmitter oscillator signal and applied to the phase reference inputs of the demodulator by a phase reference network 19. In one presently preferred embodiment the signal $\emptyset 1$ has a phase of about $-70°$ relative to the oscillator signal, and signal $\emptyset 2$ has a phase of about $+20°$ relative to the oscillator signal. Because of the manner in which the demodulated signals are subsequently combined and processed, the phases of signals $\emptyset 1$ and $\emptyset 2$ are not critical. Thus, for example, the demodulated signals do not need to be in phase quadrature, nor do either of them have to correspond to the phase of a particular object or background material, or to inductive coupling imbalance.

Means is provided for combining the demodulated signals to provide a signal MD which, as will become apparent from the discussion hereinafter, determines the maximum range of objects which can be discriminated or classified with the detector. This means comprises a summation network 21 comprising fixed resistors 22, 23 and a potentiometer 24 connected electrically in series between the outputs of demodulator 17. An inverter 26 is connected in parallel with resistor 23, whereby the $\emptyset 2$ signal is subtracted from the $\emptyset 1$ signal, and the output of the network is taken at the wiper of potentiometer 24 in accordance with the desired ratio of the two demodulated signals.

Means is also provided for combining the demodulated signals to provide a signal Q$\emptyset$ which is in phase quadrature with a signal corresponding to the ground soil or other background material in which objects are to be detected. This means comprises a summation network 28 in the form of a potentiometer 29, the ends of which are connected to the outputs of demodulator 17. The output of this network is taken at the wiper of potentiometer 29 which is set to provide the desired phase for signal Q$\emptyset$.

The maximum discrimination phase signal from summation network 21 and the quadrature phase signal from summation network 28 are applied to the inputs of differentiators 31, 32, respectively, and the differentiated signals are combined in a summation network 33 to provide a signal D$\emptyset$ corresponding to the actual phase of objects to be detected. Network 33 comprises a potentiometer 34, the ends of which are connected to the output of differentiators 31, 32, and the output of the summation network is taken at the wiper of potentiometer 34.

The output of summation network 33 is connected to the input of a differentiator 36 whereby the actual discrimination phase signal D$\emptyset$ is differentiated to provide an output signal DS. The output of differentiator 32 is connected to the input of another differentiator 37 to provide an output signal QS corresponding to the second derivative of the ground soil phase quadrature signal Q$\emptyset$.

Output signals DS and QS are applied to a modulating and gating circuit 39 which provides an output indication when the received signals change in a manner corresponding to the presence of the object to be detected. This circuit comprises a pulse width modulator 41 to which carrier signals of suitable frequency (e.g. 450 Hz) are applied from an audio oscillator 42. Phase quadrature signal QS is applied to the modulating input of the modulator, and the output of the modulator comprises a train of audio pulses modulated in width in accordance with the magnitude of the positive portion of the phase quadrature signal.

The output of modulator 41 is connected to one input of an AND gate 43. Discrimination phase signal DS is applied to the positive input of a comparator 46, and a fixed threshold reference signal $V_{REF}$ is applied to the negative input. The output of the comparator is connected to a second input of AND gate 43 whereby the modulated audio signal is gated in accordance with the polarity of the second derivative of the discrimination phase signal to provide an audio output signal AO.

An audio amplifier 48 is connected to the output of AND gate 43, and the output of the amplifier is applied to a loudspeaker 49 and/or another suitable transducer or recording device.

Operation and use of the metal detector for locating objects in the ground is as follows. Potentiometer 24 is set for the desired discrimination range limit. Potentiometer 29 is adjusted for the soil to be searched so that signal Q$\emptyset$ is in phase quadrature with signals produced by the soil itself, and potentiometer 34 is adjusted for the phase of objects to be detected. Scanning head 14 is moved over the surface of the ground, typically by swinging the head back and forth at the end of an elongated handle (not shown). Output signal DS is substantially free of changes due to the electrical and/or magnetic properties of the soil itself due to the action of differentiators 31, 36. This double differentiation effectively eliminates error caused by soil signals, since the soil signals typically have slower rates of change than do typical target signals. In fact, if the signal from the soil changes in a linear fashion while the sensing head passes over the target, the soil signal will be completely eliminated by the second differentiator.

For target signals falling within the phase acceptance range set by potentiometer 34 (i.e., "good" targets), the polarity of the central lobe of output signal DS is positive, and for target signals outside this phase range (i.e., "bad" targets), the polarity of output signal DS is inverted. The signal from oscillator 42 is modulated by output signal QS so that the width of the modulated pulses and, hence, the strength of the output signal from the modulator is proportional to the positive-going portion of output signal QS. When output signal DS is positive, the output of comparator 46 is high, and the modulated pulse train from modulator 41 is delivered to amplifier 48 and speaker 49 to provide an audible indication that a target of the desired electrical and magnetic properties is within the mutual field of the transmitting and receiving coils. When output signal DS is negative, the output of comparator 46 is low, disabling gate 43 and thereby blocking the modulated pulse train so that there is no audible output from the speaker.

The embodiment of FIG. 3 includes an oscillator 13, a sensing head 14 with transmitting and receiving coils, a synchronous demodulator 17, and a phase reference network 19 similar to the corresponding elements of the embodiment of FIG. 1. As in the embodiment of FIG. 1, synchronous demodulator provides output signals $\emptyset 1$ and $\emptyset 2$ which are demodulated at arbitrarily selected phases relative to the transmitter oscillator signal.

The outputs of demodulator 17 are connected to the inputs of a first pair of differentiators 51, 52, and the outputs of these differentiators are connected to the inputs of a second pair of differentiators 53, 54. The outputs of differentiators 53, 54 are connected to the inputs of an analog divider 57, which provides an output signal corresponding to the ratio or quotient of the signals from the differentiators. The output of the analog divider is connected to the signal input of a sample-and-hold circuit 58, and the output of the sample-and-hold circuit is applied to a meter 59 or other suitable indicator.

The outputs of demodulator 17 are also connected to a summation network 28 which comprises a potentiometer 29. As in the embodiment of FIG. 1, this network provides a signal $Q\emptyset$ which is in phase quadrature with a signal corresponding to the ground soil or other background material in which objects are to be detected.

The phase quadrature signal $Q\emptyset$ is applied to the input of a differentiator 62, and the output of this differentiator is applied to a zero crossing detector 63 comprising a comparator 64 and a one-shot multivibrator 66. The differentiated quadrature phase signal is applied to one input of the comparator, and the second input of the comparator is grounded. The output of the comparator is connected to the input of the one shot multivibrator, and the output of the multivibrator is connected to the control input of sample-and-hold circuit 58.

Means is also provided for indicating when a target comes into the field of sensing head 14. This means comprises a pulse width modulator 41 and an audio oscillator 42 similar to the corresponding elements in the embodiment of FIG. 1. The output of the pulse width modulator is connected to the input of an amplifier 67, and the output of the amplifier is connected to a loudspeaker 68 or other suitable transducer. The output of the audio oscillator is connected to the carrier input of modulator 41, and the phase reference signal $Q\emptyset$ is applied to the control input of the modulator through a threshold adjustment network 69. This network comprises a potentiometer to which voltages $+V$ and $-V$ are applied. The voltage level set by the potentiometer is applied to the control input of modulator 41 by resistor 72, and the phase reference signal $Q\emptyset$ is applied to the control input through a resistor 73.

Operation and use of the embodiment of FIG. 3 is as follows. Potentiometer 71 is adjusted so that the audio signals from oscillator 42 are just barely passed to amplifier 67 in the absence of a target. When a target comes within the field of sensing head 14, phase quadrature signal $Q\emptyset$ changes, increasing the width of the modulated pulses applied to the amplifier, thereby increasing the sound produced by loudspeaker 68.

Referring now to FIG. 4, the output signals V53, V54 from differentiators 53, 54 are the second derivatives of demodulated components $\emptyset 1$, $\emptyset 2$, respectively. The ratio of V53 and V54 is computed by analog divider 57 to provide a quotient signal V57 which corresponds to the phase of the target. Since this ratio is most accurate when the second derivatives are at their peak, sample-and-hold circuit 58 samples the quotient at that time. The peak of the second derivatives occurs when the first derivative V62 of the soil quadrature phase signal $Q\emptyset$ crosses zero. When the quadrature phase signal crosses zero, zero crossing detector 63 delivers an enabling pulse to the control input of sample-and-hold circuit 58, whereby the quotient signal V57 is sampled to provide an output signal V58. This signal is applied to meter 59 which is calibrated to indicate the character of the target.

The invention has a number of important features and advantages. It provides a metal detector that has good immunity to ground soil signals and at the same time is capable of differentiating between different types of metal objects. The detector is easy to operate and therefore suitable for operation by the relatively inexperienced hobbyist as well as the more experienced operator. The system is free of the smearing effect which is a problem with prior systems employing ringing filters and low pass filters, and targets appear to be where they are actually located. The phases of the demodulated signals themselves are not critical, and a substantial amount of phase error can be tolerated without materially degrading from the performance of the detector. In addition, the system is not dependent upon a particular swing rate or rate of movement between the sensing head and the object to be detected. Moreover, since the soil quadrature phase signal and the discrimination phase signal are selected and set downstream of the synchronous demodulator, it is possible to have good phase stability and/or a plurality of demodulated signal phases.

It is apparent from the foregoing that a new and improved metal detector has been provided. While only certain presently preferred embodiments has been described in detail, as will be apparent to those familiar with the art, certain changes and modifications can be made without departing from the scope of the invention as defined by the following claims.

We claim:

1. In apparatus for locating a metal object: transmitting means and receiving means adapted for movement relative to the metal object, means for energizing the transmitting means to produce a signal in the receiving means which changes as the receiving means is moved in proximity to the metal object, means for demodulating the received signal to provide a signal which varies in accordance with the received signal, differentiator means responsive to the demodulated signal for providing a signal which corresponds to the second derivative of the demodulated signal and has a single peak which occurs while the receiving means is passing over the metal object, and means responsive to the second derivative signal for providing an output indication when the receiving means is positioned directly over the metal object.

2. The apparatus of claim 1 wherein the means responsive to the second derivative signal includes an audio signal source and means for modulating the audio signal in accordance with the second derivative signal.

3. In apparatus for locating a metal object: transmitting means and receiving means adapted for movement relative to the metal object, means for energizing the transmitting means to produce a signal in the receiving means which changes in a predetermined manner as the receiving means is moved in proximity to the metal object, means for demodulating the received signal to provide a signal which varies in accordance with the received signal and has first and second components of different phase, differentiator means responsive to the demodulated signal for providing signals corresponding to the second derivatives of the two components, and means responsive to the second derivative signals for providing an output indication when the received signal changes in the predetermined manner.

4. In apparatus for locating a metal object: transmitting means and receiving means adapted for movement relative to the metal object, means for energizing the transmitting means to produce a signal in the receiving means which changes in a predetermined manner as the receiving means is moved in proximity to the metal object, means for demodulating the received signal to provide a signal which varies in accordance with the received signal and has first and second components of different phase, summation means for providing a signal comprising a predetermined combination of the demodulated components, differentiator means for providing a signal corresponding to the second derivative of the signal from the summation means, and means responsive to the second derivative signal for providing an output indication when the received signal changes in the predetermined manner.

5. In apparatus for locating a metal object: transmitting means and receiving means adapted for movement relative to the metal object, means for energizing the transmitting means to produce a signal in the receiving means which changes in a predetermined manner as the receiving means is moved in proximity to the metal object, means for demodulating the received signal to provide a signal which varies in accordance with the received signal and has first and second components of different phase, differentiator means responsive to the demodulated signal for providing signals corresponding to the second derivatives of the components of the demodulated signal, the first and second components being demodulated at predetermined phases relative to the transmitted signal and combined in such manner that one of the second derivative signals corresponds to the phase of the object to be located and the other second derivative signal is in phase quadrature with the signal corresponding to the background material in which the object is located, and an audio signal source, means for modulating the audio signal in accordance with one of the second derivative signals, and gating means controlled by the other second derivative signal for passing the modulated signal in accordance with said other signal to provide an output indication when the received signal changes in the predetermined manner.

6. In apparatus for locating a metal object: means including a search coil and a transmitter circuit for energizing the search coil to transmit a magnetic field and thereby induce eddy currents to flow in nearby metal objects, a demodulator circuit responsive to signals induced in the search coil by eddy currents flowing in the metal objects, a first derivative circuit responsive to the rate of change of the signal from the demodulator circuit, a second derivative circuit responsive to the rate of change of the signal from the first derivative circuit for providing a signal which peaks in magnitude when the search coil passes over the metal object, an audio oscillator circuit, an audio modulator circuit which modulates the signal from the audio oscillator circuit in accordance with the magnitude of the signal from the second derivative circuit, and an audio transducer responsive to signals from the audio modulator circuit which provides an audible indication of the presence of a metal object when the search coil is positioned directly over the object.

7. In apparatus for locating an object within a predetermined range of objects in the ground: transmitting and receiving means movable relative to the object, means for energizing the transmitting means to produce an alternating magnetic field which produces a signal in the receiving means, synchronous demodulation means responsive to the received signal for providing first and second components of said signal at different phases, means for combining said components to provide a quadrature phase signal and a maximum discrimination phase signal, said quadrature phase signal differing in phase by 90° from a signal characteristic of the ground soil, said maximum discrimination phase signal having the phase of a signal characteristic of an object within the predetermined range, means for differentiating the quadrature phase signal and the maximum discrimination phase signal, means for combining the differentiated signals to provide a discrimination phase signal corresponding to the range of objects to be located, means for differentiating the differentiated quadrature phase signal and the discrimination phase signal, and output indicator means responsive to the second derivative of the quadrature phase signal and the derivative of the discrimination phase signal for indicating the presence of an object within the predetermined range.

8. The apparatus of claim 7 wherein the output indicator means comprises a source of audio signal, means for modulating the audio signal in accordance with the second derivative of the quadrature phase signal, an output transducer, and means responsive to the derivative of the discrimination phase signal for applying the modulated audio signal to the output tranducer.

9. The apparatus of claim 8 wherein the means for modulating the audio signal comprises a pulse width modulator.

10. In apparatus for locating a metal object in a background medium: transmitting and receiving means movable relative to the background medium and the object to be detected, means for energizing the transmitting means to produce a signal in the receiving means corresponding to the magnetic and/or electrical properties of material in proximity to the transmitting and receiving means, synchronous demodulation means for providing first and second components of said signal at different phases, means for combining the first and second demodulated components to provide a quadrature phase signal which differs in phase by 90° from a signal characteristic of the background medium, means responsive to the first and second demodulated components for providing a target signal at a phase corresponding to the object to be located, means for differentiating the phase quadrature signal, a zero crossing detector for monitoring the differentiated signal and providing an output signal when the differentiated signal is crossing zero, output indicating means, and means responsive to the output signal from the zero crossing detector for sampling the target signal when the differentiated signal is crossing zero and applying the sampled signal to the output indicating means.

11. The apparatus of claim 10 wherein the means for providing a target signal includes differentiators, and the target signal corresponds to the second derivatives of the demodulated components.

12. The apparatus of claim 11 wherein the means for providing a target signal includes ratio computing means for combining the differentiated signals whereby the target signal corresponds to the ratio of the differentiated signals.

* * * * *